United States Patent

Harkins, Jr.

[15] 3,655,520
[45] Apr. 11, 1972

[54] DISTILLATION OF OLEFINS WITH ALKANOL ADDITION TO PREVENT DEGRADATION

[72] Inventor: Alvin E. Harkins, Jr., Baton Rouge, La.
[73] Assignee: Ethyl Corporation, New York, N.Y.
[22] Filed: Mar. 6, 1969
[21] Appl. No.: 804,967

[52] U.S. Cl..................................203/6, 203/38, 203/63, 260/448 AD, 260/677 A
[51] Int. Cl..........................................B01d 3/34, C07f 5/06
[58] Field of Search......................................203/6–9, 38, 63; 260/677 A, 448 AO

[56] References Cited

UNITED STATES PATENTS

| | | | |
|---|---|---|---|
| 3,257,468 | 6/1966 | Dickey | 260/448 AD |
| 3,340,160 | 9/1967 | Waldby | 203/9 |
| 3,350,282 | 10/1967 | Davis et al. | 203/63 |
| 3,350,360 | 10/1967 | McClafflin | 260/448 AD |
| 3,360,443 | 12/1967 | Apotheker | 203/9 |
| 3,362,889 | 1/1968 | Hannan | 203/6 |
| 3,384,651 | 5/1968 | Davis | 260/448 AD |
| 3,400,170 | 9/1968 | Presswood et al. | 260/677 A |
| 3,415,861 | 12/1968 | Davis et al. | 260/677 A |
| 3,420,749 | 1/1969 | Dehn | 203/6 |
| 3,448,015 | 6/1969 | Rogers | 203/9 |
| 3,450,735 | 6/1969 | Lundeen et al. | 260/448 AD |
| 3,480,519 | 11/1969 | Baker et al. | 203/63 |

Primary Examiner—Wilbur L. Bascomb, Jr.
Attorney—Donald L. Johnson

[57] ABSTRACT

The disclosure describes methods of improving the operation of olefin fractionation systems wherein residual materials contained in the olefins catalyze side reactions of the olefins during the distillation operations or subsequent thereto. The improvement is obtained by the addition of alcohols of selected molecular weight at several critical locations in the system, one location in particular.

5 Claims, 1 Drawing Figure

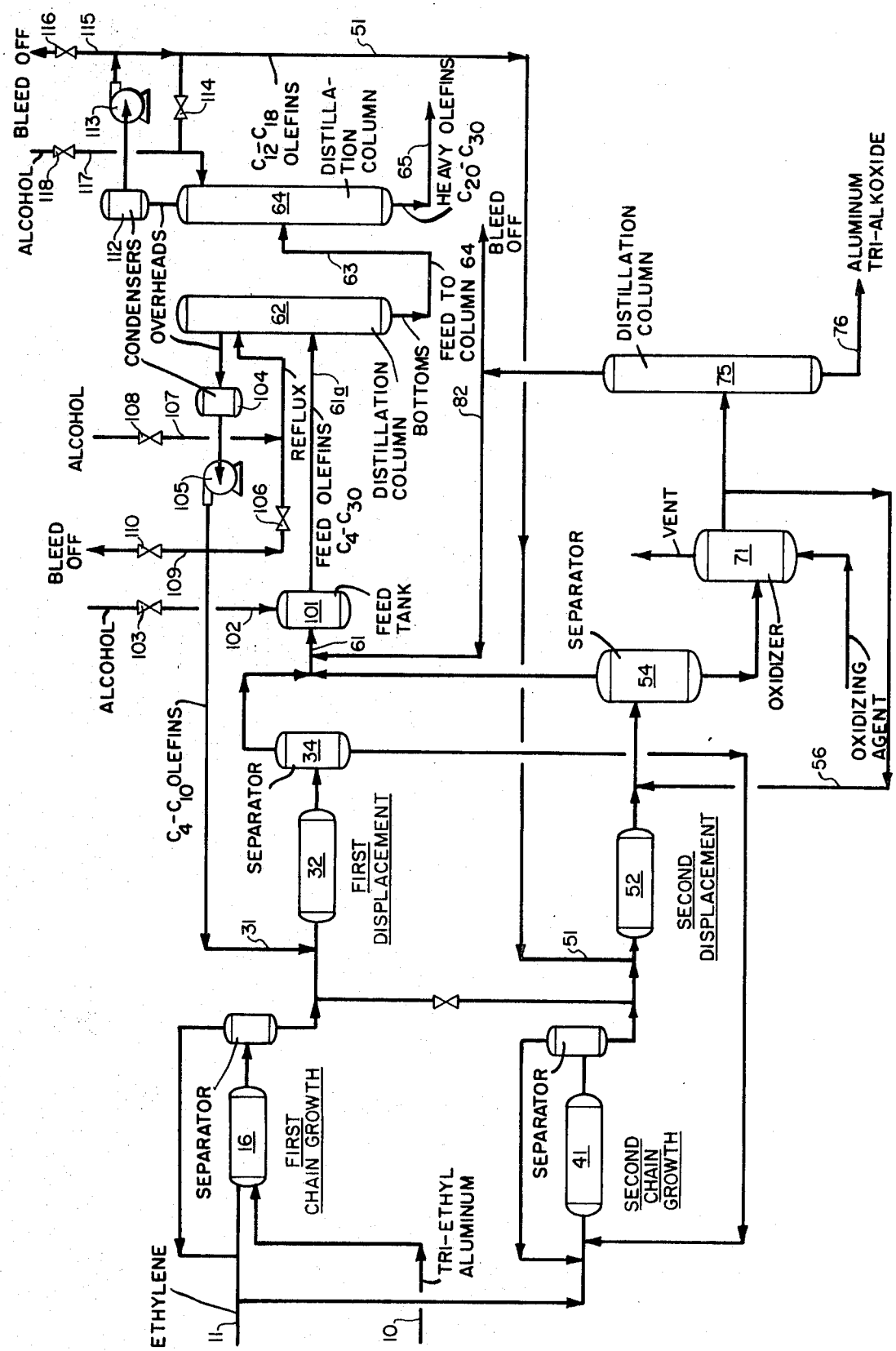

DISTILLATION OF OLEFINS WITH ALKANOL ADDITION TO PREVENT DEGRADATION

BACKGROUND OF THE INVENTION

1. Field of the Invention

The invention relates to the preparation of distilled vinyl olefins having a minimum of contamination by internal olefins and vinylidene olefins engendered during the distillation. In particular, the invention relates to improvements in distillation operations in connection with the resolutions of a spectrum of olefins having a wide range of molecular weights into cuts of narrower molecular weight range or individual olefins and avoidance of degradative side reactions and heating surface fouling in the distillation operation and in subsequent operations utilizing olefins obtained from the distillation.

2. Description of the Prior Art

In many systems for the preparation, separation and utilization of olefins, it is necessary to have contact of the olefins or their precursors with materials which are difficult to remove from the olefins and which are capable of catalyzing olefin degradation under conditions necessary in later processing or use. Distillation usually involves prolonged exposure to elevated temperature conditions. Although olefins are produced by numerous processes such as cracking, dehydrogenation, oxidation, catalytic polymerization, and chain growth and displacement, it is generally characteristic of such processes that distillation of product olefins is necessary and that complete removal of catalytic materials used in producing the olefins is virtually impossible. It has been found that aluminum alkyl materials, for example, even at trace contamination levels as low as two or three parts per million, provide significant catalytic degradation of olefins at the elevated temperatures and prolonged contact times involved in distillation and in some uses of the olefins.

Significant improvements in the purity of olefin streams are obtained by using alkoxide treatment principles disclosed in U.S. Pat. No. 3,400,170, the disclosure of which is incorporated herein by reference. The present processing operations go beyond the technique of U.S. Pat. No. 3,400,170, and are generally used in addition to such techniques.

Some of the improvements and variations of U. S. Pat. NO. 3,400,170 are shown specifically applied in the copending application of Wayne T. Davis, Ser. No. 725,120, filed Apr. 29, 1968, and granted Dec. 30, 1969 as U.S. Pat. No. 3,487,097, entitled "Process for Producing Trialkyl Aluminum Compounds." The present application shows additional improvements particularly with regard to the operations and structural details in the fractionation system and in the further treatment of feed for the fractionation system. The disclosures of the above identified copending application and its parent, now U.S. Pat. No. 3,384,641, and the related U. S. Pat. No. 3,415,861, are incorporated herein by reference.

BRIEF DESCRIPTION OF THE DRAWING

The sole FIGURE is a schematic flowsheet diagram of a preferred embodiment of the process of the invention.

The drawing typifies a preferred chain growth and displacement system for producing a wide range spectrum of olefins ranging from butylene through about triacontene in line 61. The process is based on chain growth as with ethylene on triethyl aluminum in chain growth 16 and chain growth 41. Distillation of olefins with columns 62 and 64 is required to provide separate high molecular weight olefins and low molecular weight olefins for use in a twin displacement molecular weight peaking system. The peaking is exemplified by the overall preparation of peaked aluminum trialkoxides in line 76 which predominate in materials whose individual carbon atom structures have 12–16 carbon atoms. Ethylene is fed at line 11 and triethyl aluminum at line 10. The peaking operation involves first and second displacements 32 and 52 which receive light olefins and heavy olefins, respectively, through lines 31 and 51 and which provide effluent olefins from separators 34 and 54 together with olefins from the distillation 75 supplied through line 82. The olefins are part of a "bank" system of recirculating olefins of substantially constant total quantity. An important feature of the system of the Figure with regard to improving olefin purity and reducing contamination by organic aluminum materials from 54 is a partial oxidation arrangement whereby aluminum alkoxides are fed through line 56 to vessel 54. This converts trialkyl aluminum species to at least an alkoxy dialkyl aluminum species to reduce catalytic degradation of the olefins in distillation 75 and to minimize the exposure of olefins to oxidation at oxidizer 71. Additional discussion of growth and peaking details are not necessary for an understanding of the present disclosure but such is obtainable from U.S. Pat. No. 3,384,651, which is herein incorporated by reference.

It is characteristic of good practical design and operation of systems such as the foregoing that the olefins in line 61 may contain an average of approximately 30 parts per million of aluminum in the form of various alkyl and alkoxy species, arising either through vaporization or entrainment. This is not a limiting exemplification since the efficiency of design of the components 34, 54 and 75 and associated apparatus can cause this to vary widely from about 2 parts per million of aluminum in the streams in some instances up to or even beyond 2,000 or 3,000 parts per million of aluminum. On the other hand, the "several thousand parts per million" content is usually a "surge" condition occasionally experienced even in systems of good practical design for the 30 ppm situation due to processing upsets or in start-up.

One aspect of the present invention involves reacting the feed olefin stream of line 61 with heavy alcohol, preferably normal or branched primary alcohol or mixtures of such boiling at a higher temperature than the desired heavy olefins. In this instance such are the olefins which have predominantly from 12 to 16 carbon atoms per molecule as contained in line 51. The use of light alcohol such as methanol, isopropanol and butanol is of only limited value because it vaporizes quickly and does not go where it is needed most in the distillation system. Thus, typical alcohol blended with the feed olefins is a mixture of normal and branched primary alcohols having from about 16 to about 30 carbon atoms per molecule, typically predominating in normal eicosanol and docosanol or a narrow range of about eicosanol to about octacosanol. Typically, the quantity of alcohol mixed with the feed olefins is about two times the amount theoretically required to react with three alkyl groups per molecule of aluminum present. Lower ratios, say 1:10 are suitable but less effective when needed most during periods of process upsets whereas ratios above 100:1 are effective but generally unnecessary. The heavy alcohol is combined with the olefins of line 61 in feed tank 101, the alcohols being supplied through line 102 at feed rates controlled by valve 103. Thus, the broad range is from about 1:10 to 100:1 with a preferred range being from 1:4 to 4:1 and a typical specific ratio being 2:1. A highly preferred range is 1:1 to 3:1.

The volume of feed tank 101 in proportion to the feed flow rate provides a contact time between the alcohol and the olefins of from approximately 10 minutes to about 2 hours which is largely a question of adequate volume to smooth out process surges rather than being a fundamental limitation based on the rate of alcohol reaction. Typically, the temperature of the material in feed tank 101 is determined on a basis of matching the temperature of the columns at the feed point; however, it can be below the feed temperature with a heater interposed between feed tank 101 and column 62.

Olefin composition at the feed tank 101 is largely an independent variable as far as subsequent processing is concerned with feeds to 101 ranging from a wide range Poisson distributed spectrum extending from $C_4$ to $C_{30}$ characteristic of chain growth, through a fairly flat distribution over the same range, pure streams and similar "range" distributions where various streams and components are blended. Typical also are individual narrower range streams as, for example, the individual low and high molecular weight streams from units 34, 54 and 75 of the Figure.

Treated olefins from feed tank 101 are supplied to refluxing distillation column 62, the feed being through line 61-a to an intermediate point where the internal composition in the column approximates the feed composition. The overhead vapors from column 62 go to condenser 104, condensate being delivered through pump 105 to displacement 32. Reflux for column 62 is controlled by valve 106 and then applied to the top of column 62.

Another aspect of the present invention is the combination with the reflux stream at the overhead region of column 62 of an additional quantity of alcohol added through line 017 as a rate controlled by valve 108. The importance of this additional stream of alcohol in many cases arises because the excess heavy alcohol contained in line 61A is less volatile than the "overhead" olefins so that most or all of this alcohol passes downward in column from the feed point. Thus, there is no significant amount of the "feed-contained" alcohol present in the column 62 above the feed point. Light alcohol can be added to the feed treatment alcohols to pass upward in column 62; however, this contamination of the light olefins of line 31 leads to various undesired results such as the destruction of aluminum alkyls in displacement 32 and generally is not desired. The addition of a heavy alcohol of sufficiently low vapor pressure to flow downward in column 62 thus provides a "purge" sweep of alcohol in the upper region of distillation column 62 to react with any aluminum material or other catalytic species present in that region. In general, the amount of alcohol fed through line 107 is quite small because only extremely small quantities of aluminum materials are normally present in the upper region of column 62, typically 1 part per million of aluminum or less. In general, the ratios of alcohol are in the same broad ranges, preferred ranges and typical amount as previously set forth for the amount used at the feed tank 101 based on the amount of contained aluminum.

An additional detail of the reflux system of column 62 is the vent line 109. A bleed of olefins at this point avoids a progressive buildup of non-vinyl olefins in the system. In general, this bleed stream is utilized in several ways; however, preferably the vinyl constituency thereof is recovered by selective reaction with an easily displaced aluminum alkyl material such as triisobutyl aluminum and the displacement product is returned to the system such as to chain growth 41 as described in U.S. Pat. No. 3,415,861, incorporated herein by reference.

The heavier olefins in the feed to column 62, as well as excess heavy alcohol added to the overhead or feed streams for column 62, pass downward through column 62 and are transferred via line 63 to distillation column 64. Distillation column 64 provides as overhead the "heavy" olefins for feed through line 51 to displacement 52, these being typically predominantly 45-65 percent vinyl purity alpha olefins having from 12 to 16 carbon atoms per molecule. The "heavier" olefins, predominantly those having from 18 to about 30 carbon atoms per molecule, are obtained as bottoms from column 64 through line 65.

The overhead system of column 64 includes condenser 112, pump 113 and valve 114 which control the flow of overhead olefins in the system and in addition control the reflux ratio as conventional for operation of the fractionation column. In addition to the foregoing components, line 115 provides a bleed-off of olefins from the system controlled by valve 116 to prevent the accumulation of non-vinyl olefins. As with the bleed stream from column 62, the vinyl olefin content of the bleed stream is preferably recovered by selective reaction with an easily displaced aluminum alkyl such as triisobutyl aluminum. Recovered materials are returned to an appropriate point of the system such as to the oxidizer 71 according to principles disclosed in U.S. Pat. No. 3,415,861, which is incorporated herein by reference.

The vapor pressures in the columns 62 and 64 are such that excess heavy alcohol is carried in the feed line 63 to travel downwardly through distillation column 64 from the feed point connection of line 63 so that they are still effective for the purpose of limiting the deleterious effects of olefin degradation materials present. As with column 62, this results in a situation where the heavy alcohol in the feed does not reach the upper portion of the column. It has been found to be important therefore to supply additional heavy alcohol to the reflux region of column 64 as through line 117 controlled by valve 118. In this way, an additional quantity of heavy alcohol is provided to produce an alcohol purge or sweep downward of the upper portion of column 64. The quantity of alcohol used at this point is quite low under normal circumstances, ranging as previously set forth from about 1:10 to about 100:1, preferably from about 1:4 to about 3:1, typically 2:1 based on the amount of alcohol theoretically required to react with all aluminum organo materials present considering such to be present as aluminum trialkyl, typically aluminum triethyl. In general, the aluminum content of the overhead olefins from column 64 is quite small being of the order of 2 parts per million, ranging upward to about 100 parts per million, particularly during upsets.

As an average the aluminum content of this stream is typically about 10 ppm in the absence of alcohol treatment at all points.

EXAMPLE I

A two-column distillation setup is assembled as in the Figure. Column 62 has 30 trays operative at a top temperature of 280° F. and a bottoms or reboiler temperature of 475° F. Pressure is 1 psig. The second column 64 has 12 trays with a top temperature of 300° F. and a bottoms or reboiler temperature of 530° F. Pressure is 100 mm mercury absolute.

Feed olefin to the feed tank 101 is a wide range mixture as obtained by chain growth and displacement operations. Components range from four to about 26 carbon atoms per molecule, the average being about 10 carbon atoms per molecule. The feed olefin is about 65 percent vinyl, 10 percent vinylidene and 25 percent internal olefins. Product olefin from the top of column 62 ranges from four to 10 carbon atoms per molecule averaging about eight carbon atoms per molecule. The vinyl content of the product olefin from the top of column 62 is about 65 percent.

The overhead from column 64 ranges from 12 to 18 carbon atoms per molecule with an average of about 14 carbon atoms per molecule. The vinyl purity of the olefin taken overhead from column 64 is about 65 percent. It will be appreciated that the overhead purities given for the olefin from column 62 and 64 depend on numerous factors and conditions throughout the recirculation of the complete system and upon the quantities of the bleed streams from lines 109 and 115. Wide variation is experienced depending upon the extent of the bleed withdrawal at respective points; however, for the purpose of the present invention, the relationships in the feed and discharge olefin for the distillation system per se are the items for consideration.

Olefin withdrawn at the bottom of column 64 ranges from 20 to 26 carbon atoms per molecule averaging about 22 carbon atoms per molecule. Relative quantities of the various olefin streams involved are 100 lbs of olefins/hour feed at 101, 58.24 lbs/hr of olefin from the overhead of column 62 for line 31, 40.76 lbs of olefin/hr from the overhead of column 64 for line 51 and 0.99 lb/hr of olefin from the bottom of column 64. The amount of reflux olefin fed back in column 62 is typically 34.85 lbs/hr. The amount of reflux to the top of column 64 is 5.82 lbs/hr.

In typical operation, the aluminum content of the feed at feed tank 101 is about 12.5 parts per million of aluminum in various aluminum alkyl-alkoxide forms and molecular weights. The aluminum content of the olefin taken overhead at column 62 is less than 1 part per million. On a corresponding basis, the aluminum content of the bottoms from column 62 is about 30 ppm, and the aluminum content of the overhead olefins from column 64 is about 2 ppm. (This corresponds to an *average* of about 10 ppm without alcohol addition for calculation of ratio.)

The alcohol fed to feed tank 101 is 0.09 lbs/hr; however, it is fed as the alcohol content of a process engendered complex stream containing heavy hydrocarbon to avoid distillation thereof overhead in the columns. In one typical instance, this stream contained about: 30 percent normal alcohol ranging from about $C_{18}$ to $C_{30}$, about 85 percent being $C_{20}$ to $C_{24}$; 40 percent branched chain primary alcohol ranging from about $C_{18}$ to about $C_{42}$, about 75 percent being $C_{24}$ to $C_{34}$; and 30 percent various hydrocarbon ranging from about $C_{24}$ to $C_{44}$. The specific make-up of this stream is not critical, corresponding results being obtained from feeding the individual alcohols or various mixtures of the alcohols and with various hydrocarbon diluents. The amount of alcohol fed corresponds to a ratio of 2.1:1 based on a 12.5 ppm content of aluminum in the feed stream.

Similar alcohol fed to the reflux line to the top of column 64 is at the rate of 0.02 lbs/hr for a ratio of about 2.0:1 based on a theoretical ratio of 3 mols of alcohol per mol of aluminum. In this instance an average of 10 ppm is taken as the amount of aluminum in the overhead olefin from column 64 (line 31).

In typical continuous operation, the fouling of the reboiler of column 64 is a limiting factor and is dependent upon the quantity of aluminum present in the bottom of column 64 and upon the amount of alcohol fed. Column 64 operates satisfactorily for several weeks at a time with alcohol feed to the feed tank 101 and to the top of column 64 in quantities exemplified herein when the average of the aluminum content in the olefin from the bottom of column 64 is at the foregoing 1,180 ppm range. The principal factor for minimizing the fouling of the reboilers is the alcohol supplied to feed tank 101.

This example represents a preferred mode. With uniform operation, it is not necessary to feed alcohol to column 62.

EXAMPLE II

Example I is repeated with 0.01 pound of similar alcohol per hour added to the reflux stream of column 62. Results are similar; however, the low level of less than 1 ppm aluminum and 65 percent vinyl olefin content of the stream from the top of column 62 (line 31) is maintained for wider fluctuation in feed rate and aluminum content (up to about 200 ppm aluminum in the feed to 101) and in operation of the column. This satisfactory operation is retained when the average of the olefin overhead from column 62 increases above 8 carbon atoms per molecule.

EXAMPLE III

Example I is repeated omitting the feed of alcohol at the overhead region of column 64. The vinyl purity in the overhead of column 62 remains at about 65 percent; however, the vinyl purity in the overhead of column 64 is about 45 percent. The composite purity of the feed olefin at 101 is about 60 percent. The heavy olefin at the bottom of column 64 increases to about 1.16 pounds per hour. The aluminum in the overhead of column 64 does not increase greatly but what is present appears to be more adverse as a degradation catalyst in heaters and other equipment associated with line 51.

EXAMPLE IV

Example III is repeated omitting the feed of alcohol at the feed tank 101. Results are similar to those of Example III. One exception is that the average aluminum content in the overhead of column 64 increases to 10 (this is the figure used for calculating the alcohol ratio for feed to 64 in Example I). Another exception is that the quantity of bottoms of column 64 increases to 1.46 pounds per hour.

EXAMPLE V

Example IV is repeated increasing the aluminum content of the feed stream to 200 ppm. Results are incomplete as to material balances, purities, etc. inasmuch as the reboiler of column 64 fouls to an inoperative heat transfer extent after only 6 hours of operation. The aluminum content of the feed to column 64 is 480 ppm. The aluminum content of the bottoms of column 64 is 1.9 wt percent.

EXAMPLE VI

Prior examples are repeated with wax cracked olefin. Similar desirable results of inactivation of residual materials in the olefin, including improved reboiler operation, are obtained.

EXAMPLE VII

Prior examples I-VI are repeated using olefin produced by catalytic dehydrogenation of normal paraffin hydrocarbons. Similar desirable results of inactivation of residual materials in the olefin, including improved reboiler operation, are obtained.

I claim:

1. A method of fractionating olefins in a refluxing distilling column having an overhead region, a bottom region and an intermediate feed point, said olefins having from about four to about 30 carbon atoms per molecule produced by the reaction of ethylene and triethyl aluminum to produce a light olefin fraction and a heavy olefin fraction whereby degradation of the olefins during fractionation due to the presence therein of residual aluminum alkyl compounds is limited, which comprises, feeding alkanol at the overhead region of the distilling column to flow downward in the column to react with aluminum alkyls present in the distilling column in the region thereof between the overhead region and the feed point, said alkanol having a vapor pressure which is lower than that of the light olefin fraction.

2. The method of claim 1 wherein the amount of alkanol fed is in excess of the amount required to react with aluminum alkyl present in the distilling column between the overhead region and the feed point to provide a net downward flow of said alkanol in that portion of the distilling column.

3. The method of claim 1 wherein the feed olefins have from about 12 to about 30 carbon atoms per molecule and the alkanol has from about 18 to about 30 carbon atoms per molecule.

4. The method of claim 1 wherein the olefins of the light olefin fraction have from about four to about 10 carbon atoms per molecule, wherein the olefins of the heavy olefin fraction have from about 12 to about 30 carbon atoms per molecule and where the alkanol has from about 18 to about 30 carbon atoms per molecule.

5. The method of claim 1 wherein the olefins of the light olefin fraction have from about 12 to about 18 carbon atoms per molecule, wherein the olefins of the heavy olefin fraction have from about 20 to about 30 carbon atoms per molecule and where the alkanol has from about 18 to about 30 carbon atoms per molecule.

* * * * *

PO-1050
(5/69)

UNITED STATES PATENT OFFICE
CERTIFICATE OF CORRECTION

Patent No. 3,655,520     Dated   April 11, 1972

Inventor(s)   Alvin E. Harkins, Jr.

It is certified that error appears in the above-identified patent and that said Letters Patent are hereby corrected as shown below:

Column 3, line 11 reads "017.", should read -- 107 --.
Column 4, line 72 after "30 ppm," insert -- the aluminum content of the bottoms of column 65 is about 1180 ppm --.

Signed and sealed this 5th day of December 1972.

(SEAL)
Attest:

EDWARD M. FLETCHER, JR.
Attesting Officer

ROBERT GOTTSCHALK
Commissioner of Patents